United States Patent
Luo et al.

(10) Patent No.: US 7,176,710 B1
(45) Date of Patent: Feb. 13, 2007

(54) DYNAMICALLY ADJUSTABLE TERMINATION IMPEDANCE CONTROL TECHNIQUES

(75) Inventors: Mei Luo, San Jose, CA (US); Wilson Wong, San Francisco, CA (US); Sergey Shumarayev, San Leandro, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/093,188

(22) Filed: Mar. 28, 2005

Related U.S. Application Data

(63) Continuation of application No. 10/645,932, filed on Aug. 20, 2003, now Pat. No. 6,888,370.

(51) Int. Cl.
*H03K 19/175* (2006.01)

(52) U.S. Cl. .............................. 326/30; 326/32; 326/34

(58) Field of Classification Search ............. 326/30–34
See application file for complete search history.

(56) References Cited

U.S. PATENT DOCUMENTS

| | | | |
|---|---|---|---|
| 4,719,369 A | 1/1988 | Asano et al. |
| 4,954,729 A | 9/1990 | Urai |
| 5,111,081 A | 5/1992 | Atallah |
| 5,134,311 A | 7/1992 | Biber et al. |
| 5,164,663 A | 11/1992 | Alcom |
| 5,179,300 A | 1/1993 | Rolandi et al. |
| 5,359,235 A | 10/1994 | Coyle et al. |
| 5,374,861 A | 12/1994 | Kubista |
| 5,592,510 A | 1/1997 | Van Brunt et al. |
| 5,602,494 A | 2/1997 | Sundstrom |
| 5,623,216 A | 4/1997 | Penza et al. |
| 5,656,953 A | 8/1997 | Whetsel |
| 5,721,548 A | 2/1998 | Choe et al. |
| 5,726,582 A | 3/1998 | Hedberg |
| 5,726,583 A | 3/1998 | Kaplinsky |
| 5,764,080 A | 6/1998 | Huang et al. |
| 5,864,715 A | 1/1999 | Zani et al. |

(Continued)

OTHER PUBLICATIONS

"Apex 20K Programmable Logic Device Family ver. 3.7," product data sheet Altera Corporation, San Jose, CA (May 2001).

(Continued)

*Primary Examiner*—Anh Q. Tran
(74) *Attorney, Agent, or Firm*—J. Matthew Zigmant; Townsend and Townsend and Crew LLP

(57) ABSTRACT

The on-chip impedance termination circuits can be dynamically adjusted to match transmission line impedance values. A network of termination resistors on an integrated circuit provides termination impedance to a transmission line coupled to an IO pin. The termination resistors are coupled in series and in parallel with each other. Pass gates are coupled to the resistors. The pass gates are individually turned ON or OFF to couple or decouple resistors from the transmission line. Each pass gate is set to be ON or OFF to provide a selected termination resistance value to the transmission line. The termination resistance of the resistor network can be increased or decreased to match the impedance of different transmission lines. The termination resistance can also be varied to compensate for changes in the resistors caused by temperature variations on the integrated circuit or other factors.

21 Claims, 3 Drawing Sheets

U.S. PATENT DOCUMENTS

| | | | |
|---|---|---|---|
| 5,939,896 | A | 8/1999 | Hedberg |
| 5,955,894 | A | 9/1999 | Vishwanthaiah et al. |
| 5,955,911 | A | 9/1999 | Drost et al. |
| 5,970,255 | A | 10/1999 | Tran et al. |
| 6,008,665 | A | 12/1999 | Kalb et al. |
| 6,020,760 | A | 2/2000 | Sample et al. |
| 6,026,456 | A | 2/2000 | Ilkbahar |
| 6,037,798 | A | 3/2000 | Hedberg |
| 6,049,255 | A | 4/2000 | Hagberg et al. |
| 6,064,224 | A | 5/2000 | Esch, Jr. et al. |
| 6,087,847 | A | 7/2000 | Mooney et al. |
| 6,097,208 | A | 8/2000 | Okajima et al. |
| 6,100,713 | A | 8/2000 | Kalb et al. |
| 6,118,310 | A | 9/2000 | Esch |
| 6,147,520 | A * | 11/2000 | Kothandaraman et al. .... 327/77 |
| 6,154,060 | A | 11/2000 | Morriss |
| 6,157,206 | A | 12/2000 | Taylor et al. |
| 6,181,157 | B1 | 1/2001 | Fiedler |
| 6,236,231 | B1 | 5/2001 | Nguyen |
| 6,252,419 | B1 | 6/2001 | Sung et al. |
| 6,329,836 | B1 | 12/2001 | Drost et al. |
| 6,356,106 | B1 | 3/2002 | Greef et al. |
| 6,362,644 | B1 | 3/2002 | Jeffery et al. |
| 6,366,128 | B1 | 4/2002 | Ghia et al. |
| 6,411,126 | B1 | 6/2002 | Tinsley et al. |
| 6,414,512 | B1 | 7/2002 | Moyer |
| 6,424,169 | B1 | 7/2002 | Partow et al. |
| 6,433,579 | B1 | 8/2002 | Wang et al. |
| 6,445,245 | B1 | 9/2002 | Schultz et al. |
| 6,448,813 | B2 | 9/2002 | Garlepp et al. |
| 6,466,063 | B2 | 10/2002 | Chen |
| 6,489,837 | B2 | 12/2002 | Schultz et al. |
| 6,504,397 | B1 | 1/2003 | Hart et al. |
| 6,586,964 | B1 | 7/2003 | Kent et al. |
| 6,590,413 | B1 | 7/2003 | Yang |
| 6,603,329 | B1 | 8/2003 | Wang et al. |
| 6,605,958 | B2 | 8/2003 | Bergman et al. |
| 6,639,397 | B2 | 10/2003 | Roth et al. |
| 6,642,741 | B2 | 11/2003 | Metz et al. |
| 6,683,482 | B2 | 1/2004 | Humphrey et al. |
| 6,700,823 | B1 | 3/2004 | Rahman et al. |
| 6,710,618 | B1 | 3/2004 | Murray |
| 6,747,475 | B2 | 6/2004 | Yuffe et al. |
| 6,766,155 | B2 | 7/2004 | Salcido et al. |
| 6,788,101 | B1 | 9/2004 | Rahman |
| 6,812,735 | B1 * | 11/2004 | Pham ........................ 326/30 |
| 2002/0010853 | A1 | 1/2002 | Trimberger et al. |
| 2002/0060602 | A1 | 5/2002 | Ghia et al. |
| 2002/0101278 | A1 | 8/2002 | Schultz et al |
| 2003/0062922 | A1 | 4/2003 | Douglass et al. |
| 2004/0008054 | A1 | 1/2004 | Lesea et al. |

OTHER PUBLICATIONS

"Apex II Programmable Logic Device Family ver. 1.1," product Data Sheet, Altera Corporation San Jose, CA (May 2001)

Bendak et al., "CMOS VLSI Implementation of Gigabyte/second computer network links," proceedings of the 1996 IEEE International Symposium on Circuits and Systems 2:269-272 (May 1996).

Boni et al., "LVDS I/O Interface for Gb/s-per-Pin Operation in 0.35-um CMOS," IEEE Journal of Solid-State Circuits 36(4):706-711 (Apr. 2001).

Esch et al. "Theory and Design of CMOS HSTL I/O Pads," The Hewlett Packard Journal, pp. 46-52 (Aug. 1998).

"Spartan-3 1.2V FPGA Family: Functional Description, CA DS099-2 (v1.2)," product specifications Xilinx, Inc., San Jose (Jul. 11, 2003).

"Virtex-II 1.5V Field Programmable Gate Arrays, DSO3102 (v1. 5)," product specifications Xilinx, Inc., San Jose, CA (Apr. 2, 2001).

"Virtex-II Platform FPGAs: Detailed Description, DS031-2 (v3.1)," product specifications Xilinx, Inc., San Jose, CA (Oct. 14, 2003).

"Virtex-II Pro Platform FPGAs: Functional Description, DS083-2 (v2.9)," product specifications Xilinx, Inc. San Jose CA, (Oct. 14, 2003).

* cited by examiner

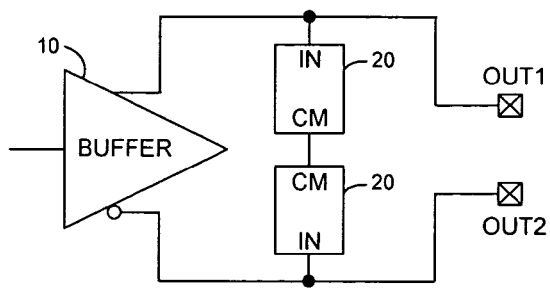
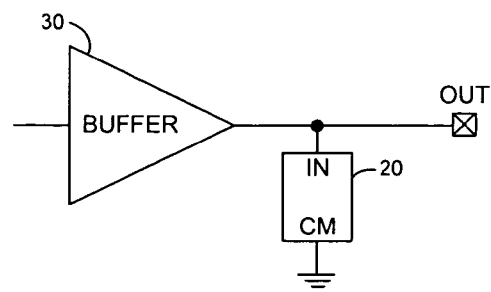
FIG. 1A
FIG. 1B
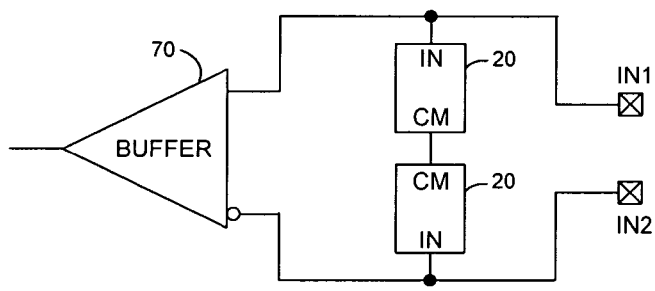
FIG. 2A
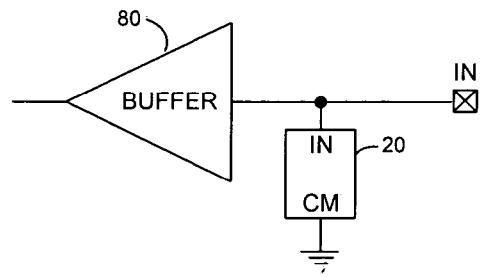
FIG. 2B

DYNAMICALLY ADJUSTABLE TERMINATION IMPEDANCE CONTROL TECHNIQUES

This application is a continuation of U.S. patent application Ser. No. 10/645,932 filed Aug. 20, 2003, now U.S. Pat. No. 6,888,370 which is incorporated herein by reference.

BACKGROUND OF THE INVENTION

The present invention relates to on-chip impedance termination circuits, and more particularly, to on-chip impedance termination circuits that are programmable and dynamically adjustable.

Integrated circuits have input/output (IO) pins that are used to transmit signals into and out of the circuit. An external termination resistor can be coupled to each IO pin to provide impedance termination. An impedance termination resistor reduces reflection of input signals on a transmission line coupled to an IO pin. Signal reflection causes signal distortion and degrades overall signal quality. A termination resistor can be selected to match the impedance of a transmission line to eliminate or reduce reflection.

The use of external resistors for termination purposes can be cumbersome and costly, especially for integrated circuits that have numerous IO pins. For example, external resistors typically use a substantial amount of board space. External resistors also degrade signal quality because of the lumped capacitance associated with physically mounting (or soldering) the resistor on the board. The lumped capacitance doesn't behave as a transmission line and may increase impedance mismatch.

To address some of the problems with external termination resistors, on-chip impedance termination techniques have been developed. Prior art integrated circuits have provided on-chip impedance termination by coupling an on-chip resistor to an IO pin. The on-chip resistor can be formed from polysilicon. The resistance of an on-chip polysilicon resistor can vary more than 30% across the standard operating temperatures of an integrated circuit (e.g., $-5°$ C. to $120°$ C.). Variations in other technology parameters such as supply voltage can also causes substantial variations in the resistance values of on-chip polysilicon termination resistors.

Another problem with prior art on-chip termination resistors is that their resistance values are fixed. Different IO standards require different termination resistances to match the impedance of different transmission lines.

Therefore, it would be desirable to provide on-chip impedance termination circuits that can be dynamically adjusted to match the impedance of different transmission lines and varying operating conditions.

BRIEF SUMMARY OF THE INVENTION

The present invention provides techniques for dynamically adjustable on-chip impedance termination circuits. The present invention allows for real-time adjustment of on-chip programmable termination impedance. For example, a user can build a feedback circuit based on an algorithm programmed into an integrated circuit. The feedback circuit can sense a condition in the integrated circuit (such as temperature) and automatically adjust the on-chip termination impedance in real-time to account for changes in the condition.

The termination impedance circuits of the present invention include networks of resistors on an integrated circuit that provide termination impedance to transmission lines coupled to IO pins. The termination resistors are coupled in series and in parallel with each other. Pass gates are coupled to the resistors. The pass gates are individually turned ON to couple resistors to the IO pin. The pass gates are individually turned OFF to decouple resistors from the IO pin. Each pass gate is set to be ON or OFF to provide a selected termination resistance value to a transmission line coupled to the IO pin.

The present invention can also generate different termination resistance values at each IO pin. Also, the termination resistance values can be adjusted to accommodate changes in temperature, voltage, and other factors. The termination resistance values can be increased or decreased to match the impedance of different transmission lines.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 1A–1B are block diagrams of dynamically adjustable impedance termination circuits coupled to output pins on an integrated circuit according to embodiments of the present invention;

FIGS. 2A–2B are block diagrams of dynamically adjustable impedance termination circuits coupled to input pins on an integrated circuit according to embodiments of the present invention;

DETAILED DESCRIPTION OF THE INVENTION

FIG. 1A illustrates a block diagram of two dynamically adjustable termination impedance circuits 20 on an integrated circuit according to an embodiment of the present invention. An integrated circuit of the present invention can include, for example, an application specific integrated circuit (ASIC), a programmable logic device (PLD), a field programmable gate array (FPGA), a programmable gate array (PLA), or a configurable logic array.

OUT1 and OUT2 are differential output pins of the integrated circuit. Buffer 10 is a differential driver circuit that drives differential signals out of the integrated circuit and onto transmission lines that are coupled to pins OUT1 and OUT2.

Termination impedance circuits 20 are coupled together at their common mode (CM) terminals. Termination impedance circuits 20 are coupled to pins OUT1 and OUT2 at their IN terminals. Circuits 20 are coupled in parallel with transmission lines connected to pins OUT1 and OUT2. Thus, circuits 20 provide parallel termination impedance at differential pins OUT1 and OUT2.

Termination impedance circuit 20 can also provide termination impedance to a single-ended output pin OUT as shown in FIG. 1B. In the embodiment of FIG. 1B, circuit 20 is coupled between output pin OUT and ground. The IN terminal of circuit 20 is coupled to OUT, and the CM terminal of circuit 20 is coupled to ground. Buffer 30 is a single-ended driver circuit that drives single-ended signals onto a transmission line coupled to OUT. Circuit 20 provides parallel termination impedance to the transmission line coupled to OUT.

Termination impedance circuit 20 can also provide termination impedance to input pins as shown in FIGS. 2A–2B. In FIG. 2A, IN1 and IN2 are differential input pins of the integrated circuit. Buffer 70 is a differential driver circuit that drives differential input signals from IN1 and IN2 into the integrated circuit. Termination impedance circuits 20 are coupled in parallel with transmission lines connected to pins IN1 and IN2. Thus, circuits 20 provide parallel termination impedance at differential pins IN1 and IN2.

In the embodiment of FIG. 2B, circuit 20 is coupled between input pin IN and ground. The IN terminal of circuit 20 is coupled to OUT, and the CM terminal of circuit 20 is coupled to ground. Buffer 80 is a single-ended driver circuit that drives single-ended input signals into the integrated circuit. Circuit 20 provides parallel termination impedance to the transmission line coupled to IN.

Figure 3:
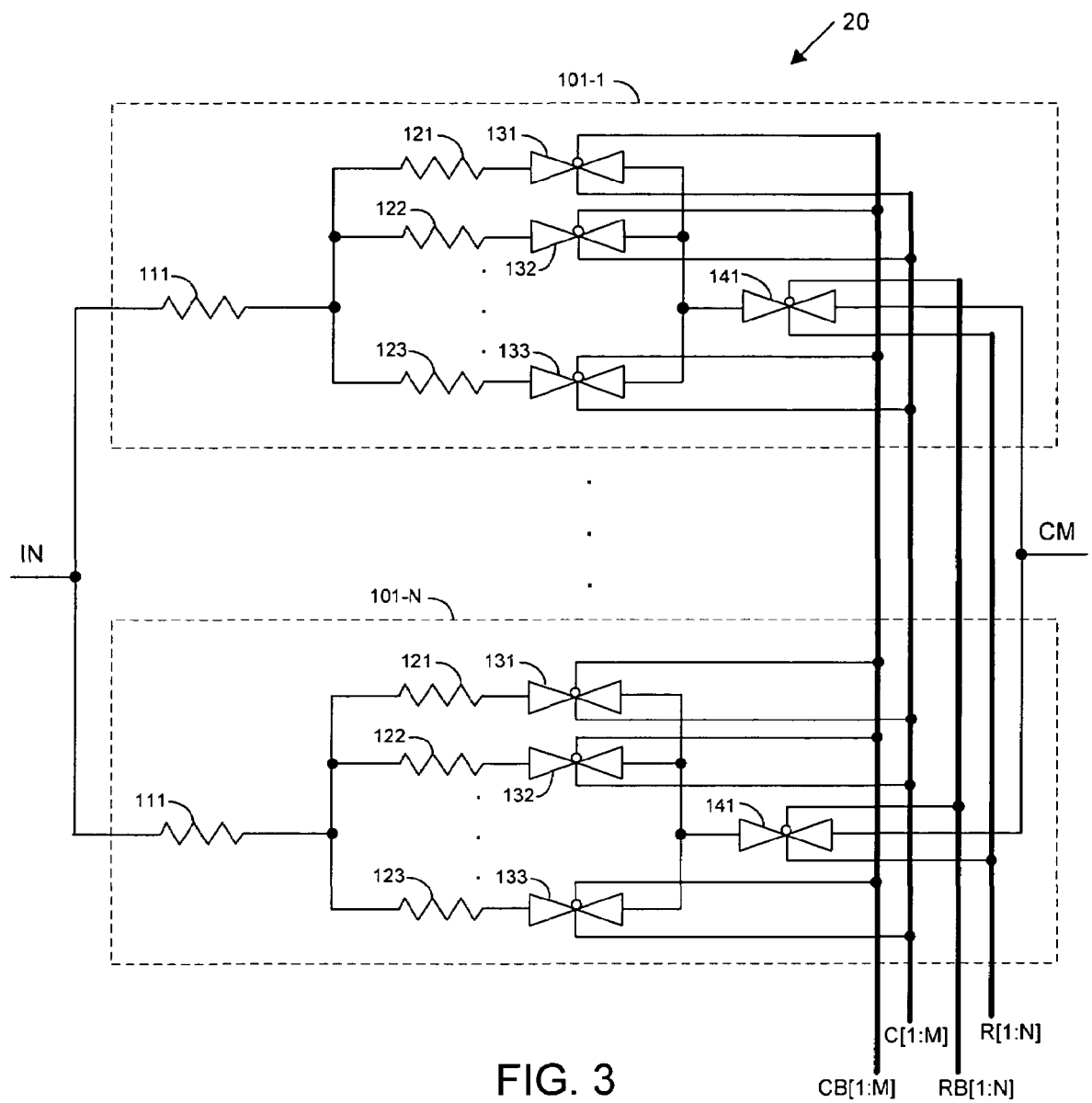
FIG. 3 is a schematic of a dynamically adjustable on-chip termination impedance circuit according to an embodiment of the present invention.

FIG. 3 illustrates a detailed schematic of dynamically adjustable termination impedance circuit 20 according to an embodiment of the present invention. Termination circuit 20 includes multiple resistor networks 101. Two resistor networks 101 are shown in FIG. 3 as an example and to simplify the drawing. Termination circuit 20 can include any number N of resistor networks 101-1 through 101-N. For example, circuit 20 can include 1, 3, 4, 5, 6, 7, or 10 resistor networks 101. Resistor networks 101 are coupled in parallel between the IN and CM terminals of termination impedance circuit 20.

Each of resistor networks 101 includes multiple on-chip resistors. For example, on-chip resistors 111, 121, 122, and 123 are shown in FIG. 3. Each resistor network 101 can include any number of resistors. Four resistors are shown in FIG. 3 merely as one example of the present invention.

Resistor network 101 also includes multiple pass gates. For example, pass gates 131, 132, 133, and 141 are shown in FIG. 3. Each of pass gates 131–133 is coupled in series with one of resistors 121–123, as shown in FIG. 3. Pass gate 141 is coupled in series with resistor 111 and resistors 121–123.

Pass gates 141 are controlled by control signals R[1:N] and complimentary signals RB[1:N], where N is the number of resistor networks 101 inside circuit 20. Thus, there are two voltage signals R and RB for each pass gate 141 in circuit 20. Signals R and RB are programmed to select which of resistor networks 101 will be enabled to conduct current between terminals IN and CM.

Pass gates 141 and pass gates 131–133 can include two CMOS pass transistors (a p-channel FET and an n-channel FET) coupled in parallel. Voltage signals R control the n-channel transistors within each of the pass gates 141, and voltage signals RB control the p-channel transistors within each of the pass gates 141. According to further embodiments of the present invention, pass gates 141 and 131–133 each include only one pass transistor. In other embodiments, pass gates 141 and 131–133 each include three or more pass transistors.

For example, when signal R1 is HIGH, and signal RB1 is LOW, pass gate 141 in network 101-1 is ON. When signal R1 is LOW, and signal RBN is HIGH, pass gate 141 in network 101-1 is OFF.

Any of pass gates 141 can be turned ON to enable a corresponding one of resistor networks 101. When a pass gate 141 in a particular resistor network 101 is OFF, current flow through that resistor network 101 is blocked.

Pass gates 131–133 in each of resistor networks 101 are controlled by control signals C[1:M] and complimentary signals CB[1:M]. M is the total number of pass gates 131–133 within circuit 20. Voltage signals C control the n-channel transistors within pass gates 131–133, and voltage signals CB control the p-channel transistors within pass gates 131–133.

For example, when signal C1 is HIGH, and signal CB1 is LOW, pass gate 131 is network 101-1 is ON. When signal C1 is LOW, and signal CB1 is HIGH, pass gate 131 in network 101-1 is OFF. When signal C2 is HIGH, and signal CB2 is LOW, pass gate 132 is ON. When signal C2 is LOW, and signal CB2 is HIGH, pass gate 132 is OFF.

Any of pass gates 131–133 in circuit 20 (and any other pass gates) can be turned ON to couple a current path through resistors 121–123, respectively, using signals C and CB. For example, pass gate 133 can be turned ON to provide a current path through resistor 123 in one of networks 101. Any of pass gates 131–133 in circuit 20 can be turned OFF to block a current path through resistors 121–123, respectively, using signals C and CB. For example, pass gate 132 can be turned OFF to block current through resistor 122 in one of networks 101.

By turning ON pass gate 141 and one or more of pass gates 131–133 in one of resistor networks 101, a current path is opened up between terminals IN and CM in that network 101. Current can flow through resistor 111 and one or more of resistors 121–123. A user of the integrated circuit can block current flow through any one of networks 101 in circuit 20 by turning OFF a corresponding one of pass gates 141.

Because resistor networks 101 are coupled in parallel with each other, the net resistance of circuit 20 can be reduced by turning ON more of pass gates 141. As current paths through more of networks 101 are opened up, the net resistance of circuit 20 decreases. Conversely, the net resistance of circuit 20 can be increased by turning OFF more of pass gates 141.

The net resistance of circuit 20 can also be reduced by turning ON more of pass gates 131–133, because resistors 121–123 are coupled together in parallel. Conversely, the net resistance of circuit 20 can be increased by turning OFF more of pass gates 131–133. The minimum resistance of circuit 20 can be achieved by turning ON all of the pass gates 141 and 131–133 in circuit 20 to provide the maximum number of current paths.

As user of the integrated circuit can control signals C, CB, R, and RB to set the net resistance of termination impedance circuit 20 to match the impedance of a transmission line. Pass gates 141 and 131–133 are turned ON or OFF to set the net resistance of circuit 20 to match the transmission line impedance.

One or more termination impedance circuits can be coupled to every IO pin on an integrated circuit, as shown for example, in FIGS. 1 and 2. Thus, the present invention provides techniques for setting the on-chip termination impedance to terminate transmission lines coupled to the IO pins. The net resistance of each circuit 20 can be programmed independently. Therefore, the on-chip termination impedance provided to each IO pin can be set to a different value to match each unique transmission line.

The present invention allows for real-time adjustment of on-chip termination impedance. For example, a user can build a feedback circuit based on an algorithm programmed into an integrated circuit. The feedback circuit can also take data from the transmission channel to determine whether the on-chip termination impedance is continuing to match the transmission line impedance. If the feedback circuit senses any changes in the on-chip termination impedance, the feedback circuit can dynamically adjust the on-chip termination impedance in real-time to compensate for these changes.

For example, as the temperature or the supply voltage of the integrated circuit changes, the resistance of resistors 111 and 121–123 also changes. Resistors 111 and 121–123 can be made, for example, of polysilicon. The feedback circuit senses the change in the termination impedance. The feedback circuit then causes or more pass gates 131–133 change state (i.e., turned ON or OFF) so that the net resistance of circuit 20 continues to match the transmission line impedance.

The feedback circuit generates control signals C, CB, R, and RB to dynamically adjust the on-chip termination impedance through gates 131–133 in circuit 20. These control signals also can be generated by other circuitry on the integrated circuit. For example, these control signals can be stored in a control RAM (CRAM) blocks on a field programmable gate array. These control signals can also be generated by programmable logic elements on a field programmable gate array. A user of the integrated circuit can program the logic elements and the CRAM blocks to generate the control signals that set the net resistance of termination impedance circuits 20. The logic elements and CRAM can be reprogrammed to change the net resistance of circuit 20. Alternatively, the user can set the values of signals C, CB, R, and RB through an input pin.

Pass gates 141 generally do not change state in response to temperature changes. Turning pass gates 141ON or OFF causes larger changes in the net resistance of circuit 20, because gates 141 control current to several resistors. The changes caused by temperature and voltage variations are usually small. Smaller changes in the net resistance can be achieved merely by changing the state of one or more of pass gates 131–133. Therefore, the present invention provides techniques for dynamically compensating for variations in the resistances of on-chip termination resistors (caused by temperature changes, etc.) by controlling gates 131–133.

Figure 4:
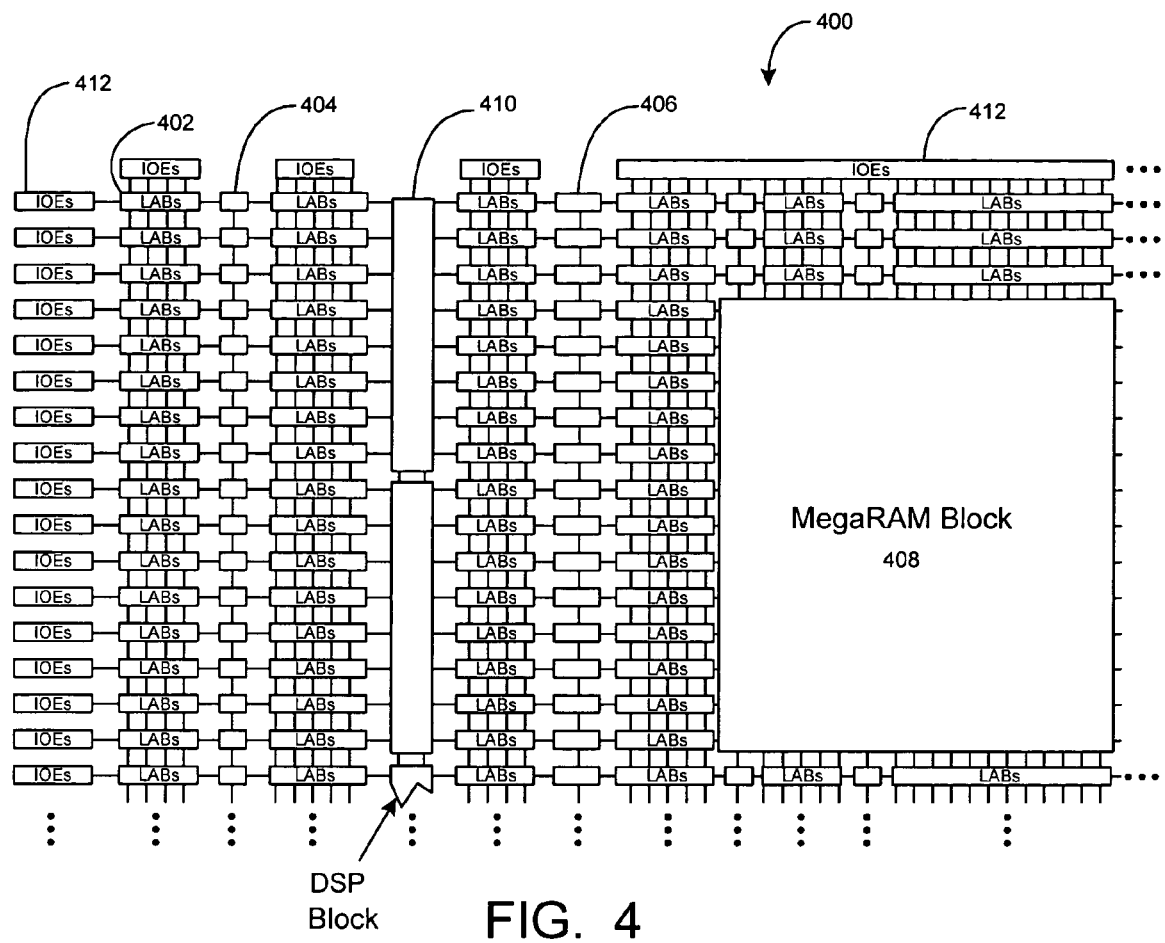
FIG. 4 is a simplified block diagram of a programmable logic device that can implement embodiments of the present invention.

Further details of an exemplary field programmable gate array that can be used to implement the techniques of the present invention is now discussed. FIG. 4 is a simplified partial block diagram of an exemplary high-density PLD/FPGA 400 that can be used to implement the present invention. PLD 400 includes a two-dimensional array of programmable logic array blocks (or LABs) 402 that are interconnected by a network of column and row interconnects of varying length and speed. LABs 402 include multiple (e.g., 10) logic elements (or LEs), an LE being a small unit of logic that provides for efficient implementation of user defined logic functions.

PLD 400 also includes a distributed memory structure including RAM blocks of varying sizes provided throughout the array. The RAM blocks include, for example, 512 bit blocks 404, 4 K blocks 406 and a MegaBlock 408 providing 512 K bits of RAM. These memory blocks may also include shift registers and FIFO buffers. PLD 400 further includes digital signal processing (DSP) blocks 410 that can implement, for example, multipliers with add or subtract features. I/O elements (IOEs) 412 located, in this example, around the periphery of the device support numerous single-ended and differential I/O standards. It is to be understood that PLD 400 is described herein for illustrative purposes only and that the present invention can be implemented in many different types of PLDs, FPGAs, and the like.

Figure 5:
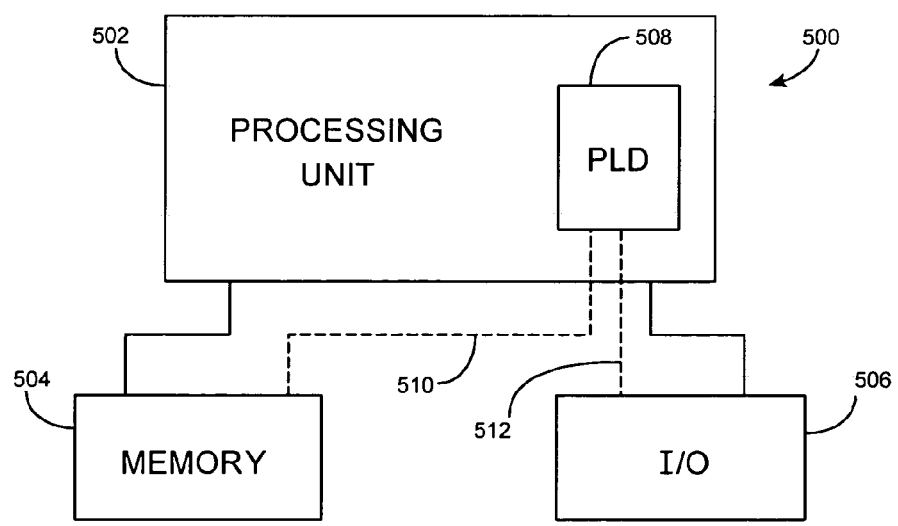
FIG. 5 is a block diagram of an electronic system that can implement embodiments of the present invention.

While PLDs of the type shown in FIG. 4 provide many of the resources required to implement system level solutions, the present invention can also benefit systems wherein a PLD is one of several components. FIG. 5 shows a block diagram of an exemplary digital system 500, within which the present invention may be embodied. System 500 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 500 may be provided on a single board, on multiple boards, or within multiple enclosures.

System 500 includes a processing unit 502, a memory unit 504 and an I/O unit 506 interconnected together by one or more buses. According to this exemplary embodiment, a programmable logic device (PLD) 508 is embedded in processing unit 502. PLD 508 may serve many different purposes within the system in FIG. 5. PLD 508 can, for example, be a logical building block of processing unit 502, supporting its internal and external operations. PLD 508 is programmed to implement the logical functions necessary to carry on its particular role in system operation. PLD 508 may be specially coupled to memory 504 through connection 510 and to I/O unit 506 through connection 512.

Processing unit 502 may direct data to an appropriate system component for processing or storage, execute a program stored in memory 504 or receive and transmit data via I/O unit 506, or other similar function. Processing unit 502 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 508 can control the logical operations of the system. In an embodiment, PLD 508 acts as a reconfigurable processor, which can be reprogrammed as needed to handle a particular computing task. Alternately, programmable logic device 508 may itself include an embedded microprocessor. Memory unit 504 may be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications can be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. An integrated circuit comprising:
   a first pad;
   a second pad;
   a differential buffer coupled to the first pad and the second pad;

a first termination impedance circuit coupled between the first pad and a common node; and
a second termination impedance circuit coupled between the second pad and the common node, the first and second termination impedance circuits each comprising:
   a plurality of series combinations, each series combination comprising a first switch and a first resistance coupled in series;
   a second switch; and
   a second resistance,
wherein each of the plurality of series combinations are coupled in parallel, and the second switch and the second resistance are coupled in series with the plurality of series combinations.

2. The integrated circuit of claim 1 wherein the first switches and the second switches each comprise an active device.

3. The integrated circuit of claim 2 wherein each of the active devices are n-channel devices.

4. The integrated circuit of claim 1 wherein the first switches and the second switches each comprise a pass gate.

5. The integrated circuit of claim 4 wherein each of the pass gates comprise an n-channel device in parallel with a p-channel device.

6. The integrated circuit of claim 1 wherein each of the plurality of series combinations are coupled between a first node and a second node, and the second switch is coupled between the second node and a third node.

7. The integrated circuit of claim 6 wherein the second resistance is coupled between the first node and a fourth node.

8. An integrated circuit comprising:
a first pad;
a buffer coupled to the first pad; and
a termination impedance circuit coupled to the first pad and comprising:
   a plurality of series combinations, each series combination comprising a first switch and a first resistance coupled in series;
   a second switch; and
   a second resistance,
wherein each of the plurality of series combinations are coupled in parallel, and the second switch and the second resistance are coupled in series with the plurality of series combinations, and each of the plurality of series combinations are coupled between a first node and a second node, and the second switch is coupled between the second node and a third node, and
wherein the second resistance is coupled between the first node and a fourth node, and the fourth node is coupled to the first pad.

9. The integrated circuit of claim 8 wherein the third node is coupled to ground, and the buffer is a single-ended buffer.

10. The integrated circuit of claim 8 wherein the third node is coupled to a second pad, the second pad is coupled to the buffer, and the buffer is a differential buffer.

11. The integrated circuit of claim 8 further comprising:
a plurality of programmable logic elements; and
a plurality of programmable interconnect lines,
wherein the plurality of programmable logic elements and the plurality of programmable interconnect lines are configurable to implement user-defined logic functions.

12. The integrated circuit of claim 8 wherein the integrated circuit is a field programmable gate array.

13. An integrated circuit comprising:
a pad;
a buffer coupled to the pad; and
a termination impedance sub-circuit coupled between the pad and a first supply voltage and comprising:
   a first series combination of a first switch and a first resistance coupled between a first node and a second node;
   a second series combination of a second switch and a second resistance coupled between the first node and the second node; and
   a third switch coupled between the second node and a third node.

14. The integrated circuit of claim 13 further comprising:
a third resistance coupled to the termination impedance sub-circuit.

15. The integrated circuit of claim 14 wherein the first switch, the second switch, and the third switch each comprise an active device.

16. The integrated circuit of claim 14 wherein the first switch, the second switch, and the third switch each comprise a pass gate.

17. The integrated circuit of claim 13 further comprising:
a third resistance coupled between the pad and the termination impedance sub-circuit.

18. An integrated circuit comprising:
a pad;
a buffer coupled to the pad; and
a termination impedance circuit coupled to the pad, the termination impedance circuit comprising a first resistance in series with a termination impedance sub-circuit, the termination impedance sub-circuit comprising:
   a plurality of series combinations coupled between a first node and a second node, each series combination comprising a first switch and a second resistance coupled in series; and
   a second switch coupled between the second node and a third node,
wherein the first resistance is coupled between the pad and the first node.

19. The integrated circuit of claim 18 wherein the first switches and the second switch each comprise a pass gate.

20. The integrated circuit of claim 1 further comprising:
a plurality of programmable logic elements; and
a plurality of programmable interconnect lines,
wherein the plurality of programmable logic elements and the plurality of programmable interconnect lines are configurable to implement user-defined logic functions.

21. The integrated circuit of claim 13 wherein the first supply terminal is ground.

* * * * *